(12) United States Patent
Wang

(10) Patent No.: US 7,082,717 B1
(45) Date of Patent: Aug. 1, 2006

(54) BOTTOM WATERING-TYPE PLANT CULTIVATION DEVICE

(76) Inventor: Young Sung Wang, 36-3, Osan-ri, Dongtan-myun, Hwasung-city, Kyoungki-do, 445-813 (KR)

(*) Notice: Subject to any disclaimer, the term of this patent is extended or adjusted under 35 U.S.C. 154(b) by 0 days.

(21) Appl. No.: 10/530,979

(22) PCT Filed: Oct. 14, 2003

(86) PCT No.: PCT/KR03/02123

§ 371 (c)(1),
(2), (4) Date: Apr. 11, 2005

(87) PCT Pub. No.: WO2004/034773

PCT Pub. Date: Apr. 29, 2004

(30) Foreign Application Priority Data

Oct. 14, 2002 (KR) .................. 10-2002-0062462

(51) Int. Cl.
*A01G 27/04* (2006.01)
*A01G 27/00* (2006.01)
(52) U.S. Cl. ............................... 47/81; 47/79
(58) Field of Classification Search .......... 47/79, 47/81
See application file for complete search history.

(56) References Cited

U.S. PATENT DOCUMENTS

| | | | |
|---|---|---|---|
| 2,554,302 A * | 5/1951 | Keskitalo ............... 222/187 |
| 3,557,490 A * | 1/1971 | Delaney ................... 47/81 |
| 4,270,309 A * | 6/1981 | Baumann ............. 47/59 R |
| 4,916,858 A * | 4/1990 | Hobson .................... 47/81 |
| 6,363,658 B1 * | 4/2002 | Lai ........................ 47/79 |
| 6,672,007 B1 * | 1/2004 | Lai ........................ 47/79 |
| 6,729,070 B1 * | 5/2004 | Locke et al. ............ 47/79 |

FOREIGN PATENT DOCUMENTS

| | | | |
|---|---|---|---|
| EP | 195542 A1 * | 9/1986 |
| EP | 290755 A1 * | 11/1988 |
| FR | 2568446 A1 * | 2/1986 |
| GB | 2127264 A * | 4/1984 |
| JP | 3-34754 | 4/1991 |
| JP | 3026081 | 4/1996 |
| JP | 10042727 A * | 2/1998 |
| JP | 10-164993 | 6/1998 |
| JP | 410296045 A * | 11/1998 |
| JP | 2004008125 A * | 1/2004 |
| KR | 20-1980-0001968 | 12/1980 |

* cited by examiner

*Primary Examiner*—Son T. Nguyen
(74) *Attorney, Agent, or Firm*—John K. Park; Park Law Firm

(57) ABSTRACT

A bottom watering-type cultivation device which supplies water from a refillable water vessel (20) provided at a lower portion of a flowerpot (1) to a plant in the flowerpot (1). The bottom watering-type plant cultivation device includes a flowerpot (1) having a bottom part projected upward at a predetermined section thereof to a predetermined height to define a nutrient solution feed space (3) under the bottom part of the flowerpot (1), a refillable water vessel (20) to contain a predetermined amount of water therein to supply the water into the flowerpot, a nutrient solution guide (30) removably installed in the nutrient solution feed space (3) of the flowerpot (1), a water absorbing unit (24) engaging with the nutrient solution guide (30), and a root intercept unit (12) to prevent roots of the plant from infiltrating into the nutrient solution feed space (3).

11 Claims, 3 Drawing Sheets

BOTTOM WATERING-TYPE PLANT CULTIVATION DEVICE

TECHNICAL FIELD

The present invention relates, in general, to plant cultivation devices and, more particularly, to a bottom watering-type cultivation device which supplies water from a refillable water vessel provided at a lower portion of a flowerpot to a plant in the flowerpot.

BACKGROUND ART

Generally, a flowerpot contains soil which is garden mold to set an ornamental plant in the soil in the flowerpot. The above-mentioned flowerpot defines a containing space to contain the garden mold therein, and includes drain holes to drain excess, remaining water from the flowerpot. At this time, to prevent the garden mold from being lost, and to drain only the water, a net or stones having a role as the net is or are provided at the drain holes in the flowerpot.

However, the conventional flowerpot forces a caretaker to supply the water to the plants in the flowerpots one by one, and to take care of the plants in flowerpots in detail. Furthermore, the conventional flowerpot is problematic in that the caretaker must repot a plant when the plant has largely grown in comparison with the flowerpot.

If the caretaker does not repot the plant when the plant has grown large, the plant in a conventional flowerpot may die, because the roots of the plant cannot sufficiently absorb water and nutrients from the soil in the flowerpot.

DISCLOSURE OF THE INVENTION

Accordingly, the present invention has been made keeping in mind the above problems occurring in the prior art, and an object of the present invention is to provide a bottom watering-type cultivation device which continuously supplies water to a plant in the cultivation device, and in which the roots of the plant efficiently absorbs the appropriate amount of water, even though trunks and leafs of the plant have grown large, and which appropriately controls the supply of the water into the cultivation device by easily detecting the amount of water contained in the cultivation device.

Another object of the present invention is to provide a bottom watering-type cultivation device which prevents the roots of the plant from infiltrating into nutrient solution-containing space parts provided at a lower portion of the cultivation device and appropriately supplies nutrient solutions from different solid manures to the plant in the cultivation device, thus safely cultivating the plant in the cultivation device.

In order to accomplish the above object, the present invention provides a bottom watering-type plant cultivation device, including a flowerpot containing a cultivation material therein to set and cultivate a plant in the cultivation material. The flowerpot has a bottom part projected upward at a predetermined section thereof to a predetermined height to define a nutrient solution feed space under the bottom part of the flowerpot. The bottom watering-type plant cultivation device further includes a refillable water vessel to contain a predetermined amount of water therein to supply the water into the flowerpot. The refillable water vessel is fitted coaxially around a lower portion of the flowerpot. The bottom watering-type plant cultivation device further includes a nutrient solution guide removably installed in the nutrient solution feed space of the flowerpot. The nutrient solution guide defines therein a pair of nutrient solution-containing space parts which respectively contain therein different solid manures gradually dissolved, so as to guide predetermined amounts of nutrient solutions in desired directions. The bottom watering-type plant cultivation device further includes a water absorbing unit to engage with the nutrient solution guide to regularly supply the water from the refillable water vessel to the solid manures in the nutrient solution-containing space parts, and a root intercept unit provided between the nutrient solution guide and the bottom part of the flowerpot to prevent the roots of the plant from infiltrating into the nutrient solution-containing space parts.

The bottom watering-type plant cultivation device may further include a hollow feed pipe mounted in the flowerpot to feed fresh water into the refillable water vessel, with a lower end of the feed pipe extending to a lower portion of the refillable water vessel. The feed pipe may be opened at an upper end thereof to form a funnel-type shape, so as to prevent the fresh water from leaking from the feed pipe when the fresh water is fed into the refillable water vessel through the feed pipe. The bottom watering-type plant cultivation device may further include a water level indicator axially installed in the feed pipe to indicate a water level in the refillable water vessel to a caretaker.

The water level indicator may include a water level indicator body having a predetermined shape, with scales formed on an external surface of the water level indicator body along a longitudinal direction, and a floating rod axially provided in the water level indicator body to rise or fall along the water level indicator body in response to the level of the water contained in the refillable water vessel.

The flowerpot may include a casing having a cylindrical-type shape and a cylindrical projection part formed by projecting a predetermined section of a bottom part of the casing upward to the predetermined height. The projection part may have a curved surface at an upper end thereof to be concave. The flowerpot may further include a plurality of feed holes formed on the curved surface of the upper end of the projection part to supply the nutrient solutions to the plant set in the casing, a ring-shaped spaced part defined between an internal surface of a sidewall of the casing and an external surface of a sidewall of the projection part, and a plurality of depressed air guide grooves arranged around the external surface of the casing at regular angular intervals to guide external air into the casing. The depressed air guide grooves may be formed by depressing the sidewall of the casing toward a central axis of the casing within a predetermined length along a longitudinal direction of the casing. The flowerpot may further include a plurality of air vent holes formed on each of the depressed air guide grooves to guide the external air into the casing. The air vent holes may be arranged along a longitudinal direction of the depressed air guide groove, and be spaced apart from each other at predetermined intervals. The flowerpot may further include a projection ring provided around an internal surface of the cylindrical projection part, such that the nutrient solution guide is coupled to the projection part in the nutrient solution feed space of the casing, a stepped part provided on the external surface of a lower portion of the casing, so that the casing is supported on the refillable water vessel while the stepped part of the lower portion of the casing is fitted over the refillable water vessel, and a passing hole formed on an upper end of the depressed air guide grooves to receive the hollow feed pipe which is longitudinally installed in the casing.

The depressed air guide groove may be formed on the external surface of the casing, such that an upper portion of the depressed air guide groove is placed above the stepped part of the casing to be exposed to the outside when the lower portion of the casing is fitted over the refillable water vessel, so that an excessive part of the water is drained from the refillable water vessel through the exposed upper portion of the depressed air guide groove.

The nutrient solution guide may include a guide frame having an annual groove provided around an external surface of the guide frame, so that the guide frame is inserted in the nutrient solution feed space by engaging the annual groove with a projection ring of a projection part of the flowerpot, and a partition plate provided in the guide frame to partition an internal space of the guide frame into the pair of nutrient solution-containing space parts which respectively contain the different solid manures therein to supply the nutrient solutions into the flowerpot. The nutrient solution guide may further include a depressed guide part provided on each of diametrically opposite parts of the external surface of the guide frame to be symmetric to each other, based on the partition plate of the guide frame, the depressed guide part being depressed to a predetermined depth to place the water absorbing unit over the guide frame, and an extending guide part vertically extending downward from the depressed guide part, and bent at an end thereof, thus supporting a spare part of the water absorbing unit which is folded to form a plurality of layers.

The guide frame may be made of a material selected from the group consisting of a soft resin, a hard resin and a high strength sponge, and the partition plate is curved at an upper end thereof to correspond to a curved surface of an upper end of the projection part of the flowerpot.

The nutrient solution-containing space parts may contain therein at least one of perlite and peat moss which are contractive and have predetermined water absorption factors, respectively, in addition to the solid manures. The cultivation material may include a material selected from the group consisting of compost, garden mold, culture medium and pumice stone, thus suitably supplying the nutrient solutions to the plant.

BRIEF DESCRIPTION OF THE DRAWINGS

The above and other objects, features and other advantages of the present invention will be more clearly understood from the following detailed description taken in conjunction with the accompanying drawings, in which.

BEST MODE FOR CARRYING OUT THE INVENTION

Figure 1:
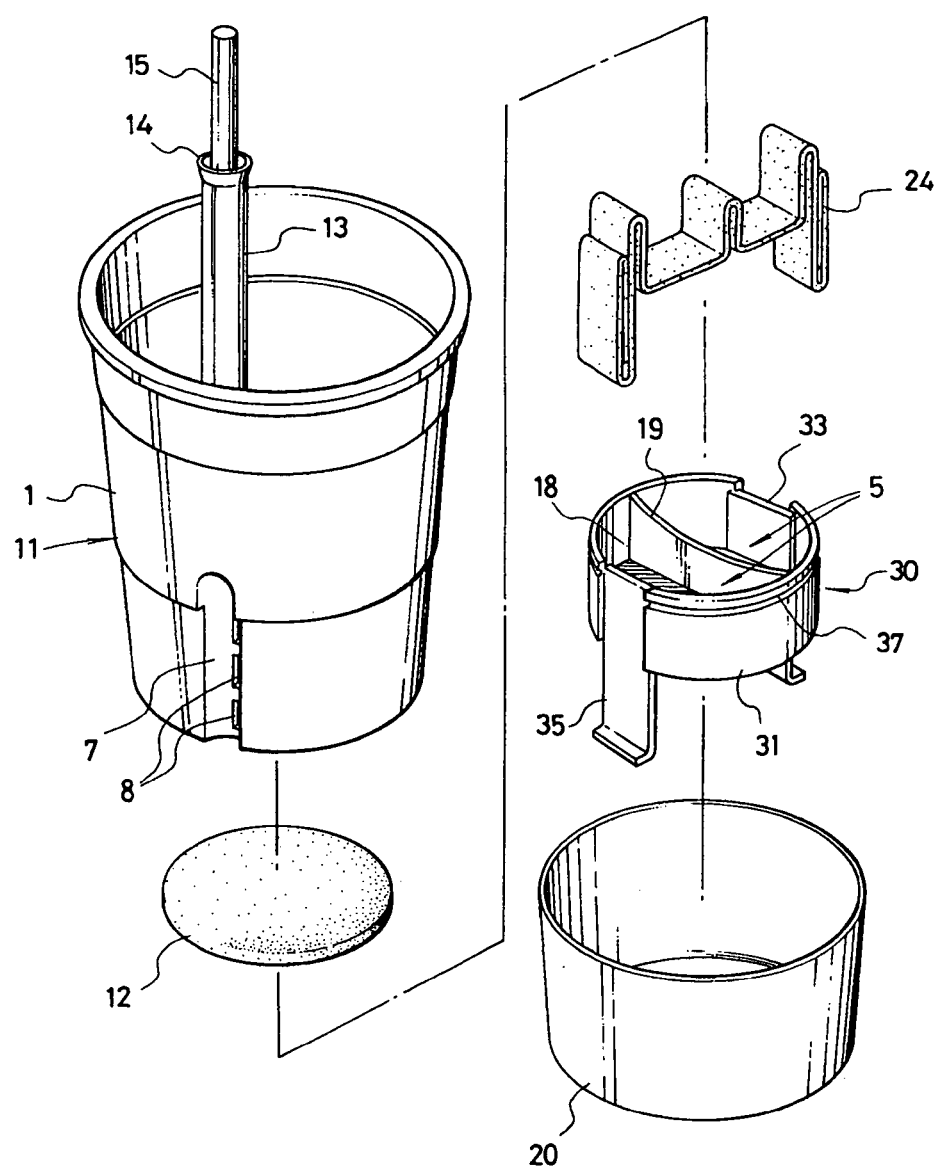
FIG. 1 is an exploded perspective view of a bottom watering-type plant cultivation device, according to an embodiment of the present invention.

Hereinafter, embodiments of the present invention will be described in detail with reference to the attached drawings.

Reference should now be made to the drawings, in which the same reference numerals are used throughout the different drawings to designate the same or similar components.

Figure 2:
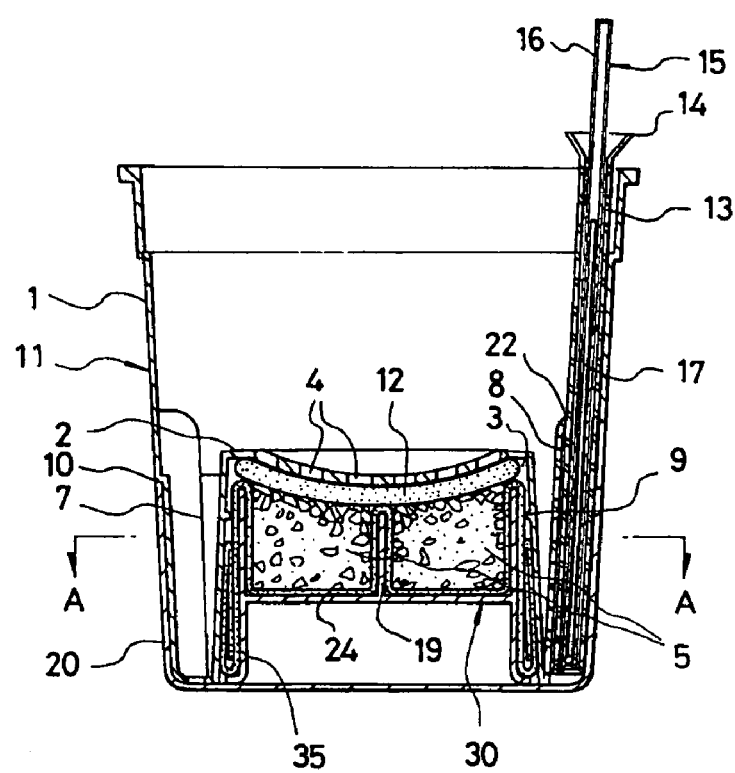
FIG. 2 is a sectional view of the bottom watering-type plant cultivation device of FIG. 1.
Figure 3:
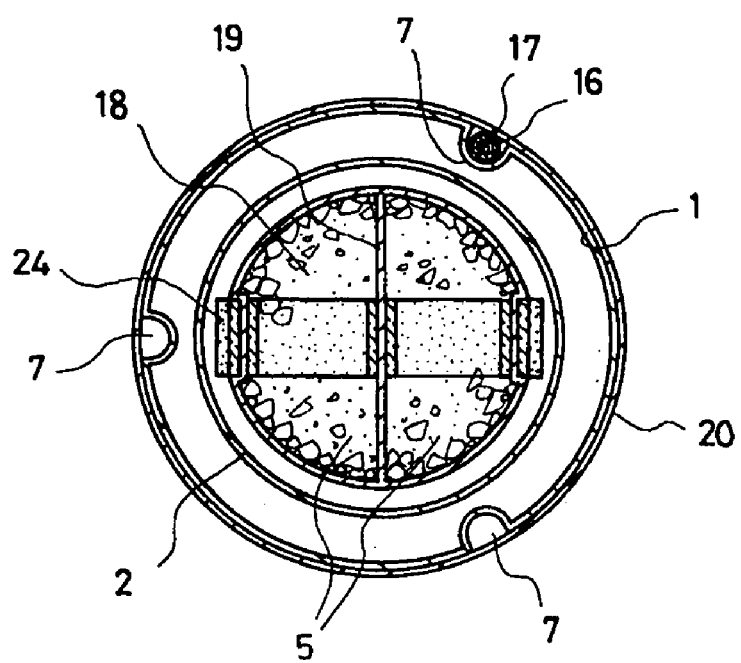
FIG. 3 is a top view showing the bottom watering-type plant cultivation device of FIG. 1.

FIG. 1 is an exploded perspective view of a bottom watering-type plant cultivation device, according to an embodiment of the present invention. FIG. 2 is a sectional view of the bottom watering-type plant cultivation device of FIG. 1. FIG. 3 is a top view showing the bottom watering-type plant cultivation device of FIG. 1.

As shown in FIG. 1, a bottom watering-type plant cultivation device includes a flowerpot 1, a refillable water vessel 20, a nutrient solution guide 30, a root intercept unit 12 and a water absorbing unit 24.

The flowerpot 1 contains a cultivation material therein to set and cultivate a plant in the cultivation material. The flowerpot 1 has a bottom part projected upward at a predetermined section thereof to a predetermined height to define a nutrient solution feed space 3 under the bottom part of the flowerpot.

The nutrient solution guide 30 is removably installed in the nutrient solution feed space 3 of the flowerpot 1. A partition plate 19 is provided in the nutrient solution guide 30 to partition an internal space of the nutrient solution guide 30 into a pair of nutrient solution-containing space parts 18. The pair of nutrient solution-containing space parts 18 respectively contain different solid manures therein to supply nutrient solutions into the flowerpot 1. The water absorbing unit 24 is provided on bottoms of the nutrient solution-containing space parts 18 of the nutrient solution guide 30 so as to regularly supply water from the refillable water vessel 20 to the solid manures in the nutrient solution-containing space parts 18. The water absorbing unit 24 consecutively extends to each of diametrically opposite parts of the nutrient solution guide 30, based on the partition plate 19 of the nutrient solution guide 30.

The above-mentioned different solid manures comprise a variety of manures which are grouped into two groups. The solid manures of the two groups are contained in water absorbing packs (not shown), respectively, such that the solid manures are respectively dissolved at predetermined rates in proportion to the amounts of water which are gradually supplied to the solid manures from the refillable water vessel 20. The different solid manures are grouped into the two groups as described above, the different solid manures are prevented from generating materials which obstruct a growth of the plant, by a chemical reaction of the different solid manures.

At least one of perlite and peat moss which are contractive and have predetermined water absorbing factors, respectively, are contained above the water absorbing unit 24 which are placed on the bottoms in the nutrient solution-containing space parts 18. In addition, the nutrient solution-containing space parts 18 contain the solid manures which are mixed with the above-mentioned one of perlite and peat moss, so that the manures are dissolved in the water which is supplied from the refillable water vessel to the nutrient solution-containing space parts 18. The root intercept unit 12 is provided directly above the solid manures to prevent the roots of the plant from infiltrating into the nutrient solution-containing space parts 18 through the bottom part of the flowerpot 1. The root intercept unit 12 prevents the nutrient solutions which are dissolved from the solid manures in the nutrient solution guide 30, from being excessively supplied to the plant in the flowerpot 1.

A hollow feed pipe 13 is mounted in the flowerpot 1 to feed fresh water into the refillable water vessel 20, with a lower end of the feed pipe 13 extending to a lower portion of the refillable water vessel 20. The feed pipe 13 is opened at an upper end thereof to form a funnel-type shape, so as to prevent the fresh water from leaking from the feed pipe 13 when the fresh water is fed into the refillable water vessel 20 through the feed pipe 13. A water level indicator 15 is axially installed in the feed pipe 13 to indicate a water level in the refillable water vessel 20 to a caretaker.

In a detailed description, as shown in FIGS. 2 and 3, the flowerpot 1 comprises a casing 11 which has a cylindrical-type shape, so as to contain the cultivation material in the casing 11, thus setting and cultivating the plant in the cultivation material in the casing 11. The casing 11 includes a cylindrical projection part 2 which is formed by projecting a predetermined section of a bottom part of the casing 11 upward to the predetermined height. The projection part 2 has a curved surface at an upper end thereof to be concave.

A plurality of feed holes 4 are formed on the curved surface of the upper end of the projection part 2 of the casing 11 to supply the nutrient solutions to the plant which is set in the casing 11. A ring-shaped spaced part 5 is defined between an internal surface of a sidewall of the casing 11 and an external surface of a sidewall of the projection part 2. The ring-shaped spaced part 5 contains a part of the cultivation material therein. At this time, the cultivation material comprises a material selected from the group consisting of compost, garden mold, culture medium and pumice stone, which suitably supply the nutrient solutions to the plant in the casing 11.

A plurality of depressed air guide grooves 7 are arranged around the external surface of the casing 11 at regular angular intervals to guide external air into the casing 11. Each of the depressed air guide grooves 7 is formed by depressing the sidewall of the casing 11 to a position close to the external surface of the sidewall of the projection part 2 toward a central axis of the casing 11 within a predetermined length along a longitudinal direction of the casing 11. A plurality of air vent holes 8 are formed on each of the depressed air guide grooves 7 to guide the external air into the casing 11. Each of the depressed air guide grooves 7 is formed on the external surface of the casing 11, such that an upper portion of the depressed air guide groove 7 is placed above a stepped part 10 of the casing 11 to be exposed to the outside when a lower portion of the casing 11 is fitted over the refillable water vessel 20, so that an excessive part of the water is drained from the refillable water vessel 20 through the exposed upper portion of the depressed air guide groove 7.

A projection ring 9 is provided around an internal surface of the cylindrical projection part 2, such that the nutrient solution guide 30 is coupled to the projection part 2 in the nutrient solution feed space 3 of the casing 11. The above-mentioned stepped part 10 is provided on the external surface of the lower portion of the casing 11 under the exposed upper portions of the depressed air guide grooves 7, so that the casing 11 is supported on the refillable water vessel while the stepped part 10 of the lower portion of the casing 11 is fitted over the refillable water vessel 20. A passing hole 22 is formed on an upper end of the depressed air guide grooves 7 to receive the hollow feed pipe 13 which is longitudinally installed in the casing 11.

As shown in FIG. 2, the water level indicator 15, which is axially installed in the feed pipe 13, includes a water level indicator body 16 which has a predetermined shape, with scales formed on an external surface of the water level indicator body 16 along a longitudinal direction. The water level indicator 15 further includes a floating rod 17 which is axially provided in the water level indicator body 16 to rise or fall along the water level indicator body 16 in response to the level of the water contained in the refillable water vessel 20.

As shown in FIG. 1, the nutrient solution guide 30 has a guide frame 31 which includes annual grooves 37 provided around an external surface of the guide frame 31, so that the guide frame 31 is inserted in the nutrient solution feed space 3 by engaging the annual grooves 37 with the projection ring 9 of the projection part 2 of the casing 11. The guide frame 31 further includes the partition plate 19 which is provided in the guide frame 31 to partition the internal 95 space of the guide frame 31 into the pair of nutrient solution-containing space parts 18 which respectively contain the different solid manures therein to supply the nutrient solutions into the casing 11. The nutrient solution guide 30 further has a depressed guide part 33 which is provided on each of diametrically opposite parts of the external surface of the guide frame 31 to be symmetric to each other, based on the partition plate 19 of the guide frame 31. Each of the depressed guide parts 33 is depressed to a predetermined depth, so that the water absorbing unit 24 engages with the guide frame 31. The nutrient solution guide 30 further has an extending guide part 35 which vertically extends downward from each of the depressed guide parts 33 and is bent at an end thereof, thus supporting a spare part of the water absorbing unit 24 which is folded to form a plurality of layers. At this time, the water absorbing unit 24 has a length which is sufficiently long so as to flexibly correspond to a size and a depth of the refillable water vessel 20.

In the embodiment, the above-mentioned guide frame 31 of the nutrient solution guide 30 is made of a hard resin. However, to fit the water absorbing unit 94 over the guide frame 31, the guide frame 11 may be made of a soft resin or a high strength hardening sponge. The partition plate 19 is curved at an upper end thereof to correspond to the curved surface of the upper end of the projection part 2.

Furthermore, the annular grooves 37 are formed around the external surface of the nutrient solution guide 30 to be symmetric to each other, based on the depressed guide parts 33, such that the annular grooves 37 engage with the projection ring 9 of the projection part 2.

INDUSTRIAL APPLICABILITY

As described above, the present invention provides a bottom watering-type cultivation device which consecutively supplies water to a plant in the cultivation device. Even though stems and leaves of the plant have grown large, the roots of the plant absorbs the appropriate amount of water without getting stressed. Therefore, a caretaker can conveniently take care the plant which is set in the bottom watering-type cultivation device of the present invention. The plant, which is set in the bottom watering-type cultivation device of the present invention, increases its life span without repotting the cultivation device.

Furthermore, the bottom watering-type cultivation device of the present invention provides convenience for the caretaker and induces well-balanced growth of the plant by evenly supplying nutrient solution and water to the plant for a long period of time.

In addition, the application of a refillable water vessel to the bottom watering-type cultivation device of the present invention is easy without being limited to a size of the refillable water vessel. Accordingly the size of the refillable water vessel may be changed according to a favorite of the caretaker so as to control a supply of the water in the refillable water vessel.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A bottom watering-type plant cultivation device, comprising:
   a flowerpot containing a cultivation material therein to set and cultivate a plant in the cultivation material, the flowerpot having a bottom part projected upward at a predetermined section thereof to a predetermined height to define a nutrient solution feed space under the bottom part of the flowerpot;
   a refillable water vessel to contain a predetermined amount of water therein to supply the water into the flowerpot, the refillable water vessel being fitted coaxially around a lower portion of the flowerpot;
   a nutrient solution guide removably installed in the nutrient solution feed space of the flowerpot, the nutrient solution guide defining therein a pair of nutrient solution-containing space parts which respectively contain therein different solid manures gradually dissolved, so as to guide predetermined amounts of nutrient solutions in desired directions;
   a water absorbing unit engaging with the nutrient solution guide to regularly supply the water from the refillable water vessel to the solid manures in the nutrient solution-containing space parts; and
   a root intercept unit provided between the nutrient solution guide and the bottom part of the flowerpot to prevent roots of the plant from infiltrating into the nutrient solution-containing space parts.

2. The bottom watering-type plant cultivation device according to claim 1, further comprising:
   a hollow feed pipe mounted in the flowerpot to feed fresh water into the refillable water vessel, with a lower end of the feed pipe extending to a lower portion of the refillable water vessel, the feed pipe being opened at an upper end thereof to form a funnel-type shape, so as to prevent the fresh water from leaking from the feed pipe when the fresh water is fed into the refillable water vessel through the feed pipe; and
   a water level indicator axially installed in the feed pipe to indicate a water level in the refillable water vessel to a caretaker.

3. The bottom watering-type plant cultivation device according to claim 2, wherein the water level indicator comprises:
   a water level indicator body having a predetermined shape, with scales formed on an external surface of the water level indicator body along a longitudinal direction; and
   a floating rod axially provided in the water level indicator body to rise or fall along the water level indicator body in response to the level of the water contained in the refillable water vessel.

4. The bottom watering-type plant cultivation device according to claim 2, the flowerpot comprises:
   a casing having a cylindrical-type shape;
   a cylindrical projection part formed by projecting a predetermined section of a bottom part of the casing upward to the predetermined height, the projection part having a curved surface at an upper end thereof to be concave;
   a plurality of feed holes formed on the curved surface of the upper end of the projection part to supply the nutrient solutions to the plant set in the casing;
   a ring-shaped spaced part defined between an internal surface of a sidewall of the casing and an external surface of a sidewall of the projection part;
   a plurality of depressed air guide grooves arranged around the external surface of the casing at regular angular intervals to guide external air into the casing, the depressed air guide grooves being formed by depressing the sidewall of the casing toward a central axis of the casing within a predetermined length along a longitudinal direction of the casing;
   a plurality of air vent holes formed on each of the depressed air guide grooves to guide the external air into the casing, the air vent holes being arranged along a longitudinal direction of the depressed air guide groove, and being spaced apart from each other at predetermined intervals;
   a projection ring provided around an internal surface of the cylindrical projection part, such that the nutrient solution guide is coupled to the projection part in the nutrient solution feed space of the casing;
   a stepped part provided on the external surface of a lower portion of the casing, so that the casing is supported on the refillable water vessel while the stepped part of the lower portion of the casing is fitted over the refillable water vessel; and
   a passing hole formed on an upper end of the depressed air guide grooves to receive the hollow feed pipe which is longitudinally installed in the casing.

5. The bottom watering-type plant cultivation device according to claim 4, the depressed air guide groove is formed on the external surface of the casing, such that an upper portion of the depressed air guide groove is placed above the stepped part of the casing to be exposed to the outside when the lower portion of the casing is fitted over the refillable water vessel, so that an excessive part of the water is drained from the refillable water vessel through the exposed upper portion of the depressed air guide groove.

6. The bottom watering-type plant cultivation device according to claim 1, the nutrient solution guide comprises:
   a guide frame comprising:
      an annual groove provided around an external surface of the guide frame, so that the guide frame is inserted in the nutrient solution feed space by engaging the annual groove with a projection ring of a projection part of the flowerpot; and
      a partition plate provided in the guide frame to partition an internal space of the guide frame into the pair of nutrient solution-containing space parts which respectively contain the different solid manures therein to supply the nutrient solutions into the flowerpot;
      a depressed guide part provided on each of diametrically opposite parts of the external surface of the guide frame to be symmetric to each other, based on the partition plate of the guide frame, the depressed guide part being depressed to a predetermined depth to place the water absorbing unit over the guide frame; and
   an extending guide part vertically extending downward from the depressed guide part, and bent at an end thereof, thus supporting a spare part of the water absorbing unit which is folded to form a plurality of layers.

7. The bottom watering-type plant cultivation device according to claim 6, the guide frame is made of a material selected from the group consisting of a soft resin, a hard resin and a high strength sponge, and the partition plate is curved at an upper end thereof to correspond to a curved surface of an upper end of the projection part of the flowerpot.

8. The bottom watering-type plant cultivation device according to claim 6, the nutrient solution-containing space parts contain therein at least one of perlite and peat moss which are contractive and have predetermined water absorption factors, respectively, in addition to the solid manures.

9. The bottom watering-type plant cultivation device according to claim 1, the cultivation material comprises a material selected from the group consisting of compost, garden mold, culture medium and pumice stone, thus suitably supplying the nutrient solutions to the plant.

10. The bottom watering-type plant cultivation device according to claim 1, the root intercept unit prevents the nutrient solutions which are dissolved from the solid manures in the nutrient solution guide, from being excessively supplied to the plant.

11. The bottom watering-type plant cultivation device according to claim 1, the different solid manures in the nutrient solution guide are contained in water absorbing packs, respectively, such that the solid manures are dissolved at predetermined rates in proportion to the amounts of water which are gradually supplied to the solid manures from the refillable water vessel.

* * * * *